(12) United States Patent
Wyman et al.

(10) Patent No.: US 8,768,150 B2
(45) Date of Patent: Jul. 1, 2014

(54) METHOD AND SYSTEM FOR TRICK MODE SUPPORT IN A MOTION ADAPTIVE DEINTERLACER WITH INVERSE TELECINE

(75) Inventors: Richard H. Wyman, Sunnyvale, CA (US); Kevin (Jean-Huang) Chen, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1520 days.

(21) Appl. No.: 11/051,415

(22) Filed: Feb. 4, 2005

(65) Prior Publication Data
US 2006/0078293 A1 Apr. 13, 2006

Related U.S. Application Data

(60) Provisional application No. 60/617,328, filed on Oct. 8, 2004.

(51) Int. Cl.
*H04N 5/783* (2006.01)
*H04N 9/70* (2006.01)

(52) U.S. Cl.
USPC .................... 386/343; 386/300; 386/349

(58) Field of Classification Search
None
See application file for complete search history.

(56) References Cited

U.S. PATENT DOCUMENTS

| | | | | |
|---|---|---|---|---|
| 5,805,173 A | * | 9/1998 | Glennon et al. | 345/501 |
| 7,129,990 B2 | * | 10/2006 | Wredenhagen et al. | 348/449 |
| 7,519,266 B1 | * | 4/2009 | Willis et al. | 386/343 |
| 2006/0013568 A1 | * | 1/2006 | Rodriguez | 386/111 |

* cited by examiner

*Primary Examiner* — Heather Jones
(74) *Attorney, Agent, or Firm* — Foley & Lardner LLP

(57) ABSTRACT

A system and method that repeat video images in a deinterlacing system. The method comprises detecting a signal requesting an input video image be repeated and determining the desired number of repetitions. The input video image may then be processed to generate an output video image and the output video image may be repeated the desired number of repetitions. The input video images following the repeated image may be held until the repeating is completed, and may then be processed and displayed. Repeating the video image may be utilized to achieve different playback modes such as, for example, slow motion, pause, and video rate conversion.

20 Claims, 6 Drawing Sheets

METHOD AND SYSTEM FOR TRICK MODE SUPPORT IN A MOTION ADAPTIVE DEINTERLACER WITH INVERSE TELECINE

RELATED APPLICATIONS

This patent application makes reference to, claims priority to and claims benefit from U.S. Provisional Patent Application Ser. No. 60/617,328, entitled "Method and System for Trick Mode Support in a Motion Adaptive Deinterlacer with Inverse Telecine," filed on Oct. 8, 2004, the complete subject matter of which is hereby incorporated herein by reference, in its entirety.

This application makes reference to:
U.S. Provisional Patent Application Ser. No. 60/540,717, filed Jan. 30, 2004;
U.S. application Ser. No. 10/945,769 filed Sep. 21, 2004;
U.S. application Ser. No. 10/875,422 filed Jun. 24, 2004;
U.S. application Ser. No. 10/945,619 filed Sep. 21, 2004;
U.S. application Ser. No. 10/945,587 filed Sep. 21, 2004;
U.S. application Ser. No. 10/871,758 filed Jun. 17, 2004;
U.S. application Ser. No. 10/945,817 filed Sep. 21, 2004;
U.S. application Ser. No. 10/945,729 filed Sep. 21, 2004;
U.S. application Ser. No. 10/945,828 filed Sep. 21, 2004;
U.S. application Ser. No. 10/946,152 filed Sep. 21, 2004;
U.S. application Ser. No. 10/871,649 filed Jun. 17, 2004;
U.S. application Ser. No. 10/946,153 filed Sep. 21, 2004;
U.S. application Ser. No. 10/945,645 filed Sep. 21, 2004;
U.S. Provisional Patent Application Ser. No. 60/616,071 filed Oct. 5, 2004;
U.S. patent application Ser. No. 11/027,365, filed Dec. 30, 2004;
U.S. patent application Ser. No. 11/026,369, filed Dec. 30, 2004; and
U.S. patent application Ser. No. 11/027,140, filed Dec. 30, 2004.

The above stated applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A per-pixel multi-field motion adaptive deinterlacer keeps a record of several fields of pixels to successfully measure motion and correctly adapt the output deinterlaced pixel based on that measure of motion. The field type (TOP/BOTTOM) is taken into account to ensure valid motion values. Visually annoying artifacts will result if a TOP field is supplied in a situation when a BOTTOM field is expected (and vice versa).

Trick modes are, for example, pause, slow motion, fast forward, fast reverse, etc., anything other than standard linear playback. During linear playback, a system can rely upon a regular sequence of alternating TOP and BOTTOM fields. There may be a situation where the sequence may momentarily not alternate. A situation where the sequence momentarily does not alternate such as, for example, a TOP field followed by another TOP field, will be a rare occurrence and can be considered an error condition. When such an error condition occurs, a method of artifact mitigation is a suitable course of action.

Repeated field types, or even identical repeated fields, are common during trick mode operation. The same method of artifact mitigation, although possible, would produce lesser quality trick mode video than would otherwise be possible.

There are several methods to reduce errors associated with trick mode operation. One method of performing trick modes without a deinterlacer would be to use a scaler to invert field types. A problem with such a method is causing up and down jittering of horizontal lines and other areas of high vertical detail. A second method of performing trick modes without a deinterlacer would be to use only one field type from the source such as, for example, using TOP fields only or BOTTOM fields only. Using this method produces no up and down jittering, but does reduce vertical resolution, in addition to reducing temporal resolution, which makes a video look more "jerky." Performing trick modes without a deinterlacer can be problematic because they require disabling and re-enabling the deinterlacer when entering and subsequently leaving trick mode, which can be awkward and would require software effort to ensure clean transitions.

Alternatively, errors can be reduced using methods that perform trick modes with a deinterlacer. One method would be to repeat fields at the input of the deinterlacer, and the deinterlacer drops back into spatial mode only and ignoring temporal information. Using this method causes up and down jittering of horizontal lines and other areas of high vertical detail.

The system may not suffer from awkward software control that may arise when it enters and leaves trick modes as video may still be passing through the deinterlacer. In a second method, the regular alternating field types at the input to the deinterlacer may be maintained and captured to memory after the deinterlacer. The second method may require at least twice the memory bandwidth with equivalent performance. Since memory bandwidth is finite, the use of other features in the system may be precluded.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that repeat video images in a deinterlacer. The method may comprise detecting a request to repeat a first video image input into the deinterlacer; processing the first video image to produce a corresponding output video image; holding input video images following the first video image in the deinterlacer; displaying the output video image according to the request to repeat; and processing and displaying the video images following the first video image.

In an embodiment of the present invention, the request to repeat may comprise a number of repetitions corresponding to a desired video playback mode. A desired playback mode may comprise pausing, wherein the image may be repeated indefinitely until a request to terminate the repeating is detected.

Another desired playback mode may comprise slow motion playing, wherein each image may be repeated a number of repetitions corresponding to a desired slow motion rate.

Yet another desired playback mode may comprise converting a display rate associated with the video from an original display rate to a desired display rate, wherein the number of repetitions may comprise repeating an input video image at a periodic rate corresponding to the desired conversion rate.

The system comprises at least one processor capable of performing the method as described hereinabove that repeats video images in a deinterlacer.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention relate to processing video signals in motion adaptive deinterlacers. More specifically, certain embodiments of the present invention relate to a method and system for trick mode support in a motion adaptive deinterlacer with inverse telecine. In an embodiment of the present invention, a per-pixel multi-field motion adaptive deinterlacer with inverse telecine may provide high quality linear playback video with mitigation of unwanted artifacts from the occasional unexpected non-alternating field type. The motion adaptive deinterlacer may also provide good quality trick mode video output, where a non-alternating field type is often required and to be expected. An embodiment of the present invention may also provide a method for trick mode support that may allow for high quality trick modes or 50 to 60 Hz conversion simultaneously with the inverse telecine of film-sourced material.

An embodiment of the present invention may be utilized in a motion adaptive deinterlacer with inverse telecine. U.S. patent application Ser. No. 10/945,587, entitled "Improvement of Reverse Pull-Down Video Using Corrective Techniques" filed Sep. 21, 2004 discloses an exemplary motion adaptive deinterlacer with per-pixel correction for mixed 3:2, 2:2 and interlaced video and bad-edit detection. Accordingly, U.S. patent application Ser. No. 10/945,587, filed Sep. 21, 2004 is hereby incorporated herein by reference in its entirety.

Certain aspects of the invention may comprise methods and systems for a motion adaptive deinterlacer (MAD) capable of reverse 3:2 pull-down and 2:2 pull-down with cadence detection, which may be referred to as MAD-3:2 or MAD32, that may be utilized in a video network (VN). The algorithms and architectures for the motion adaptive deinterlacer may be adapted to acquire interlaced video fields from one of a plurality of video sources in the video network and convert the acquired interlaced video fields into progressive frames, at double the display rate, in a visually pleasing manner.

In accordance with another aspect of the invention, the algorithms and architectures for the motion adaptive deinterlacer (MAD) may also be adapted to provide bad-edit detection in order to ensure a visually pleasing transition to new cadence in situations where editing may have been carelessly performed. Furthermore, per-pixel correction may also be provided to improve the quality of subject matter containing both film and video at the same time. For example, per-pixel correction may be utilized for interlaced titles, which have been overlaid on film-based content. The motion adaptive deinterlacer (MAD) may also provide optional CPU control over, for example, 3:2 and/or 2:2 cadence detection and correction.

Figure 1:
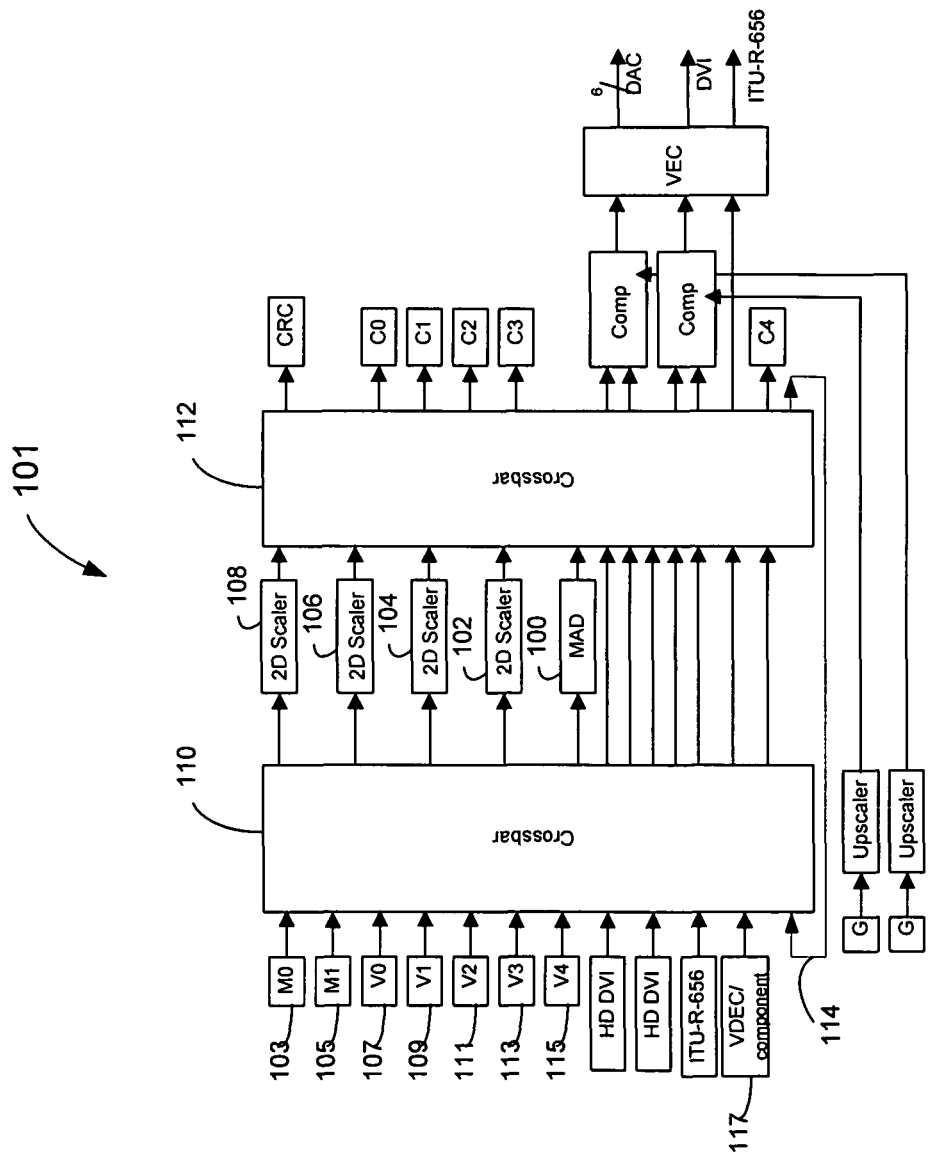
FIG. 1 illustrates a block diagram of an exemplary architecture showing the positioning of a MAD 100, in accordance with an embodiment of the present invention

FIG. 1 illustrates a block diagram of an exemplary architecture 101 showing the positioning of a MAD 100, in accordance with an embodiment of the present invention. Referring to FIG. 1, the MAD 100 along with a plurality of scalers (102, 104, 106, and 108), for example, may be positioned between a first crossbar 110 and a second crossbar 112. The first crossbar 110 may be referred to as an input crossbar and the second crossbar 112 may be referred to as an output crossbar.

The MAD 100 may comprise at least one video network input and at least one video network output and may be configured to maintain its own additional field stores. A feedback path may be provided from the output of the second crossbar 112 to the input of the first crossbar 110. This may allow any of the standard definition (SD) video sources such as the MPEG feeders 103 and 105, video feeders 107, 109, 111, 113 and 115, and/or VDEC 117, and so on, to function as an input to the MAD 100 and/or one of the scalers 102, 104, 106, and 108. The VDEC 117 may be an analog video decoder that may process NTSC or PAL signals to separate color from luma. The MPEG feeders 103 and 105 may accept 4:2:0 and 4:2:2 video data and supply 4:2:2 video data. The video feeders 107, 109, 111, 113 and 115, may accept 4:2:2 video data and supply 4:2:2 video data. The output of the second crossbar 112 may be passed back to the first crossbar 110 via the feedback path 114.

U.S. patent application Ser. No. 10/314,525, entitled "Network Environment for Video Processing Modules" filed Dec. 9, 2002 discloses an exemplary crossbar network module and associated system, which is representative of the video network crossbar that may be utilized in connection with the present invention. Accordingly, U.S. patent application Ser. No. 10/314,525 filed Dec. 9, 2002 is hereby incorporated herein by reference in its entirety.

In an embodiment of the present invention, the CPU may indicate before each input field the configuration of the deinterlacer. The configuration may include characteristics of an input field such as, for example, whether the input field is a TOP or BOTTOM field, whether to perform certain functions such as, for example, a Hard Start or Force Spatial. Additional options may be provided to the CPU to specify modes with commands such as, for example, FIELD_FREEZE and FRAME_SKIP.

FIELD_FREEZE may cause a current input field to be an identical repeat of the previous input field. In an embodiment of the present invention, FIELD_FREEZE may be utilized with the pause trick mode. FIELD_FREEZE may be used indefinitely in pause trick mode.

In an embodiment of the present invention, FIELD_FREEZE may be utilized with the slow motion trick mode. An input field may be frozen for many field times followed by a step one field forward, which in turn, is then repeated many times, resulting in a slow motion effect.

In an embodiment of the present invention, FIELD_FREEZE may be utilized for 50 to 60 Hz conversion. An input field may be repeated every five fields on a regular pattern. When FIELD_FREEZE is specified, the corresponding output frame may be an identical repeat of the previous output frame. Any 3:2 or 2:2 state, including any per-pixel corrective techniques may be maintained for the second output frame to be identical to the previous output frame.

When a bad-edit is detected, it may not be known whether the next input field to the deinterlacer is going to be a FIELD_FREEZE (repeated) field since such information may be available just before the next field is presented to the deinterlacer. In an embodiment of the present invention, the entire state of the deinterlacer may be copied into some form of mirror storage just before an input field is processed. If it turns out that the next field is a FIELD_FREEZE (repeated) field, the state of the deinterlacer may be wound back by restoring from the mirror storage.

In another embodiment of the present invention, the change of the internal state may be delayed until it is known that the next field is not a repeat. By delaying the change of its internal state, an identical output frame may be produced because the state used to produce the previous output frame may have been retained. Once a configuration is given by software that the next field is not a repeat of the previous one, that stored indication may be used to update the state of the deinterlacer and allow it to move on to the next output frame.

In an embodiment of the present invention, FIELD_FREEZE may be specified to the deinterlacer and the input field to the deinterlacer may be an identical repeat. As a result, the same picture may be maintained at the output of the deinterlacer. Since the deinterlacer may maintain a large amount of state information temporally located both before and after the current output picture, maintenance of the state may be necessary to maintain an identical output picture at the output. Any changes in the state may change the output picture, so once the FIELD_FREEZE condition is removed and subsequent fields start getting fed into the deinterlacer, the output pictures may continue exactly as if nothing had happened (i.e. the output pictures compared against those generated if no trick-mode pause had been issued would be identical).

FRAME_SKIP may cause frames to be skipped in a sequence of frames, and may be used when fast-forwarding. Since this is a frame skip rather than a field skip, the regular pattern of alternating TOP and BOTTOM fields is not broken. Additionally, FRAME_SKIP may not interfere with any 2:2 pulldown present since it is a frame-by-frame operation. Because of its pattern of five fields, reverse 3:2 pulldown may be abandoned to avoid any problems that may arise from an unknown field phase.

Figure 2:
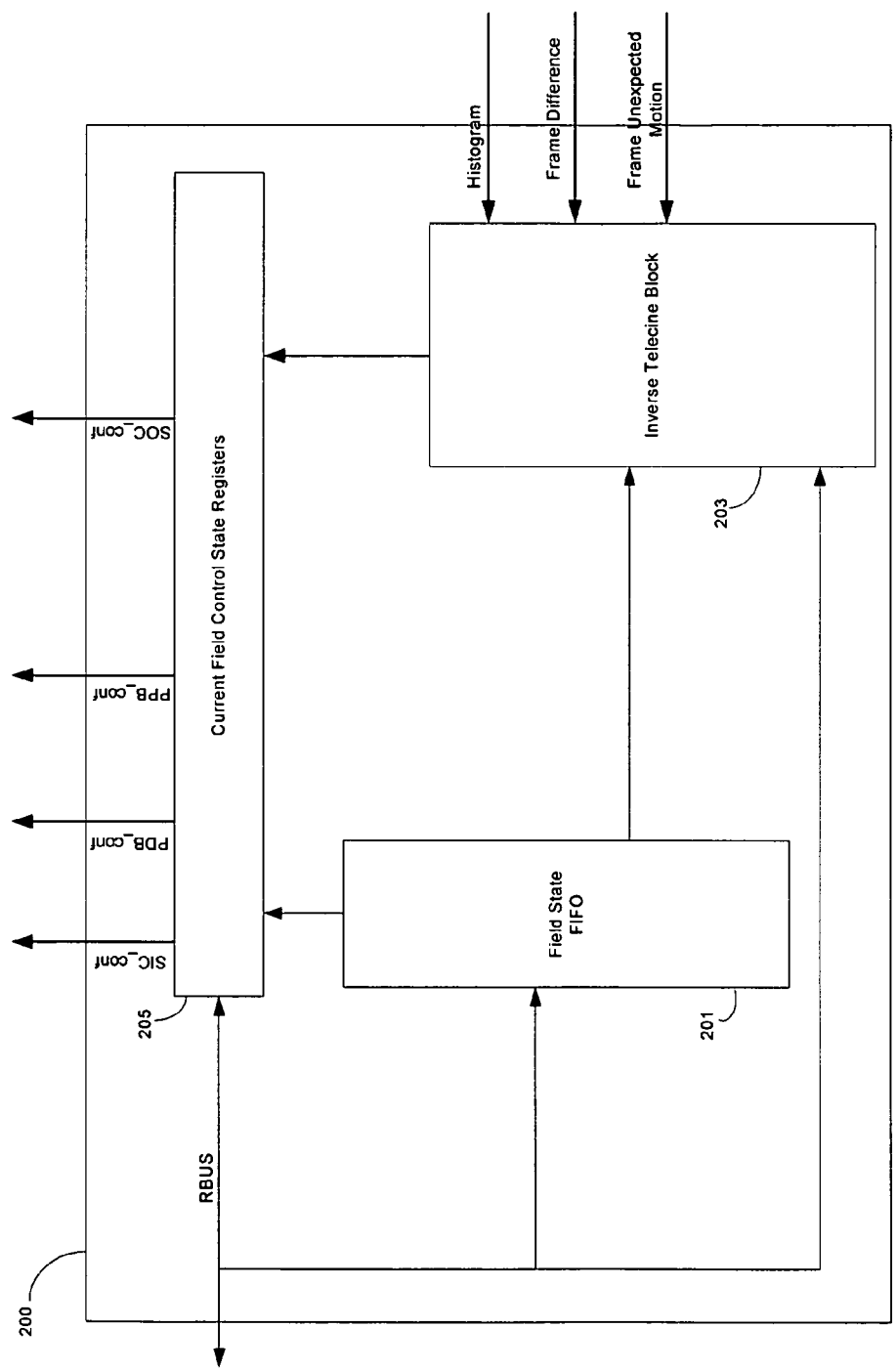
FIG. 2 illustrates a block diagram of an exemplary field control block, in accordance with an embodiment of the present invention.

FIG. 2 illustrates a block diagram of an exemplary field control block 200, in accordance with an embodiment of the present invention. The field control block 200 may control the state of other blocks in the system, which may change on an input field-by-field basis. The field control block 200 may output signals that configure the modes of other blocks, and may support implementation of trick modes. In an embodiment of the present invention, the field control block 200 may comprise three sub-modules: a field state FIFO block 201, an inverse telecine block 203, and a current field control state registers block 205.

In an embodiment of the present invention, the field state FIFO block 201 may provide an interface to the deinterlacer for the system CPU. The field state FIFO block 201 may retain information regarding the state of all the field stores and start and stop transitions, such that the CPU software may use a single command for each field without having to keep records of events associated with previous fields. U.S. patent application Ser. No. 10/945,729, entitled "Method and System for Control of a Multi-Field Deinterlacer Including Providing Visually Pleasing Start-up and Shut-down" filed Sep. 21, 2004, describes a field control block such as the field control block 200. Accordingly, U.S. patent application Ser. No. 10/945,729 filed Sep. 21, 2004 is hereby incorporated herein by reference in its entirety.

Figure 3:
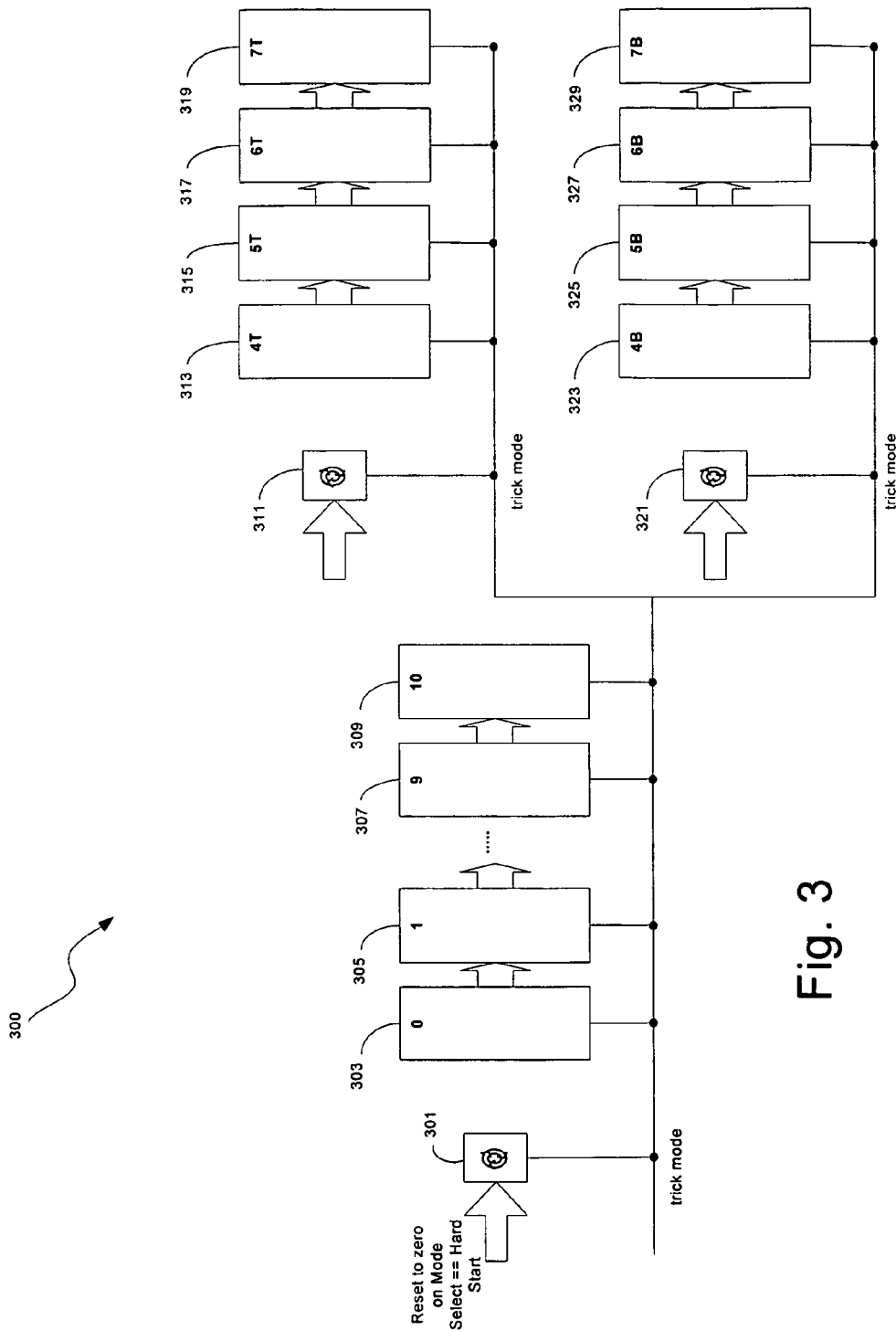
FIG. 3 illustrates a block diagram of an exemplary field state FIFO, in accordance with an embodiment of the present invention.

FIG. 3 illustrates a block diagram of an exemplary field state FIFO 300, in accordance with an embodiment of the present invention. The field state FIFO 300 may be, for example, the field state FIFO 201 of FIG. 2. The field state FIFO 300 may comprise a field buffer index rotate 301 with associated field store buffers such as, for example, buffers 303, 305, 307 and 309. The field state FIFO 300 may also comprise a TOP field quantized motion (QM) buffer index rotate 311 and a BOTTOM field QM buffer index rotate 321 with associated TOP field QM buffers and BOTTOM field QM buffers such as, for example, buffers 313, 315, 317, and 319, and buffers 323, 325, 327, and 329, respectively.

The field buffer index rotate 301 may be adapted to rotate bits from one field store buffer to another upon receiving an input command. The TOP QM buffer index rotate 311 may be adapted to rotate bits from one TOP field QM buffer to another upon receiving an input command. The BOTTOM QM buffer index rotate 321 may be adapted to rotate bits from one BOTTOM field QM buffer to another upon receiving an input command. The plurality of field store buffers 303, 305, 307, and 309 may comprise suitable logic, circuitry and/or code that may be adapted to store the states of various fields. The plurality of TOP field QM buffers 313, 315, 317, and 319 may be adapted to store the states of various TOP fields and the plurality of BOTTOM field QM buffers 323, 325, 327 and 329 may be adapted to store the states of various BOTTOM fields.

When operating under trick mode, the field control FIFO stage 0, for example, may be effectively overwritten, the rest of the field control FIFO may not be shifted, and the field buffers and TOP and BOTTOM buffer indices 301, 311, and 321, respectively, may not be rotated.

Figure 4A:
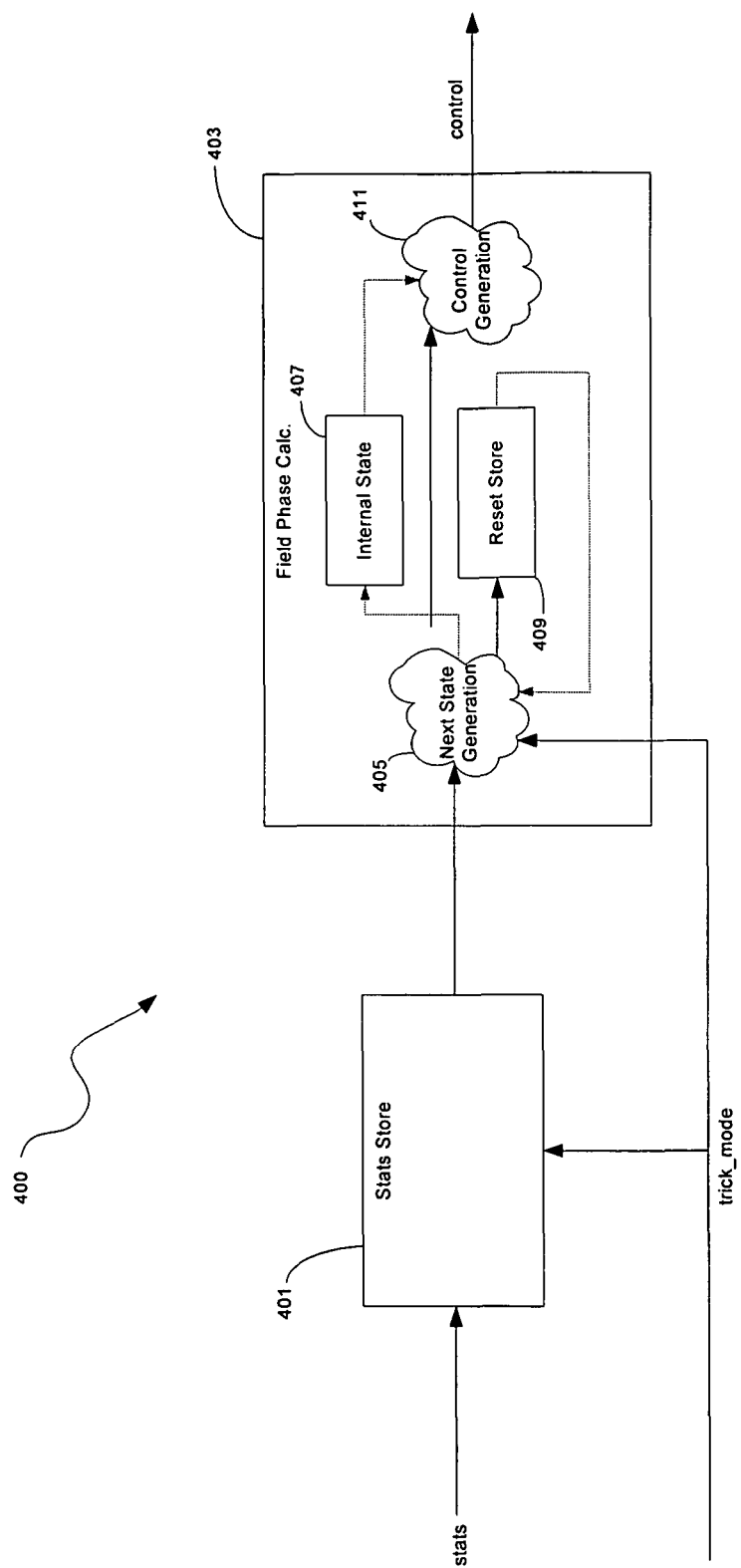
FIG. 4A illustrates a block diagram of an exemplary inverse telecine block, in accordance with an embodiment of the present invention.

FIG. 4A illustrates a block diagram of an exemplary inverse telecine block 400, in accordance with an embodiment of the present invention. The inverse telecine block 400 may be, for example, the inverse telecine block 203 of FIG. 2. The inverse telecine block 400 may allow detection of 3:2 or 2:2 pull-down, in addition to providing correct control to the functionality that processes pixels to allow occurrence of reverse 3:2 or 2:2 in the deinterlacer.

In an embodiment of the present invention, the inverse telecine block 400 may comprise a stats store block 401 and a field phase calculation block 403. The field phase calculation block 401 may comprise a next state generation block 405, an internal state block 407, a reset store block 409, and a control generation block 411.

During trick mode programming by the CPU, the stats store block 401 may comprise logic, circuitry and/or code that may be adapted to receive at least an input signal stats and generate an output signal stats store to the field phase calculation block 403. The next state generation block 405 may be adapted to receive an input signal stats store from the stats store block 401 for calculation and generate an output to the internal state block 407. The internal state block 407 may be adapted to receive an input signal from the next state generation block 405 to determine the next internal state and generate an output to the control generation block 411. The reset store block 409 may be adapted to receive a signal from the next state generation block 405 and generate a reset store signal back to the next state generation block 405. The control generation block 411 may be adapted to receive a plurality of inputs from the next state generation block 405 and the internal state block 407 and generate a control signal control to the CPU.

In an embodiment of the present invention, stats may be stored in the stats store block 401 based on the trick_mode signal. The next state generation block 405 may take the stats_store and use it for calculation and then determine both, the next internal state and whether a reset is warranted (due to a bad edit, for example), the determination of which may be stored in the reset store block 409. The reset store block 409 may send a reset_store signal at the beginning of every field_start to clear the next internal state. When the specified trick mode is FIELD FREEZE, the next internal state may not be cleared even if a reset_store signal is asserted. The internal state may be maintained the same as the previous state while the trick mode is FIELD FREEZE. When a non-trick mode field is indicated, the reset may be acted upon, and the inverse telecine state may be updated accordingly.

Figure 4B:
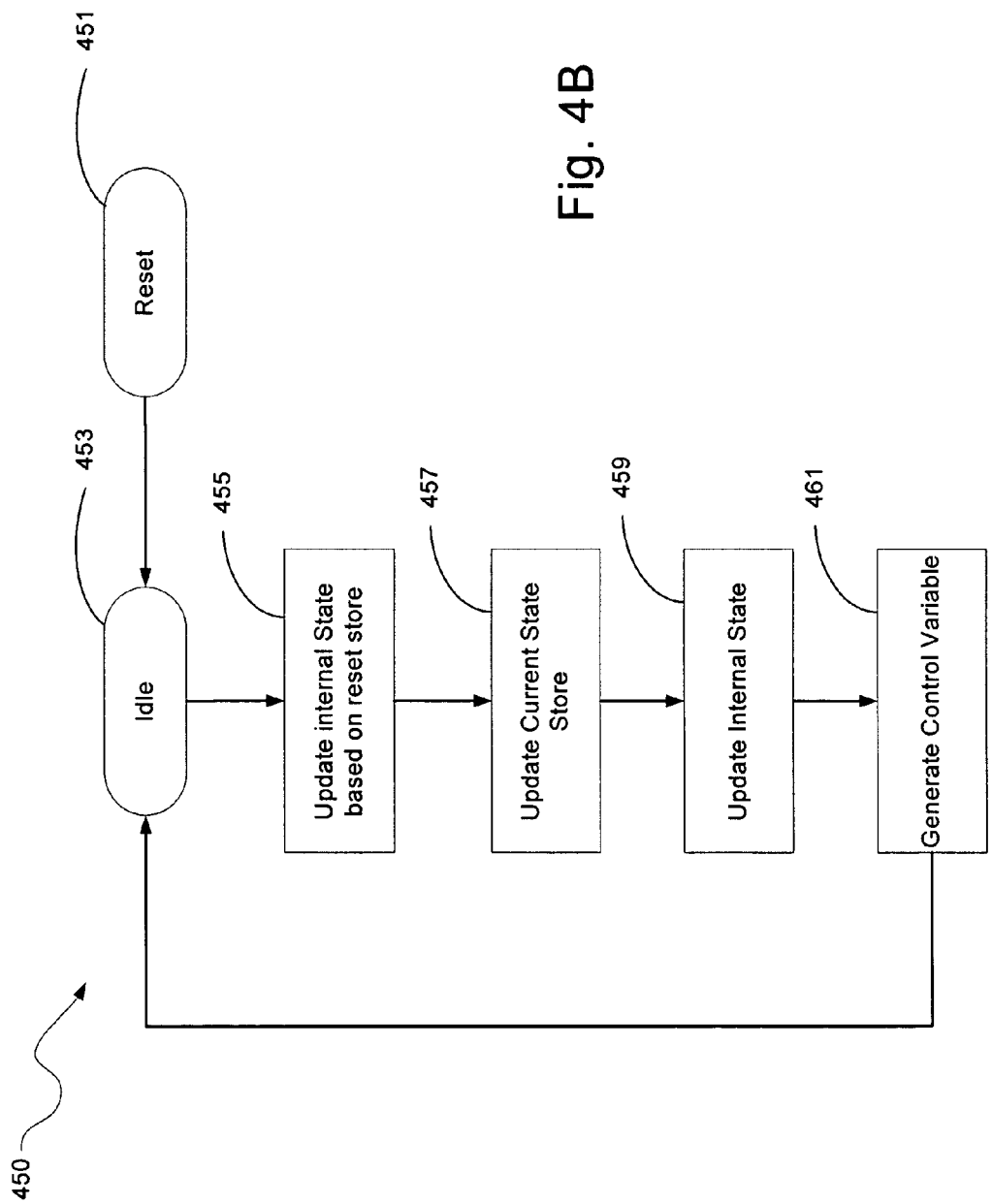
FIG. 4B illustrates a flowchart of an exemplary process in the inverse telecine block 400, in accordance with an embodiment of the present invention.

FIG. 4B illustrates a flowchart of an exemplary process 450 in the inverse telecine block 400, in accordance with an embodiment of the present invention. The system may be in an idle state at 453. A reset signal may be sent at 451 from a field state FIFO such as, for example, the field state FIFO block 201 of FIG. 2. At a next step 455 the internal state 407 may be updated based on signals sent by the reset store block 409, which may be specified with a field start signal. Internal state 407 may be cleared based on reset store, as described hereinabove. The internal state 407 may be updated later based on signals from the next state generation block 405. When the internal state 407 is updated, the current stats store may also be updated at a next step 457 upon assertion of the field start signal. At a next step 459 the internal state 407 may be additionally updated based on the stats_store signal received by the next state generation block 405. The output signal produced by the control generation block 411 may be updated based on the outputs of the next state generation block 405 and the internal state 407. The control signal may then be generated at a next step 461 by the control generation block 411. The system may then return to the idle state 453 and wait for a new start of field command.

Figure 4C:
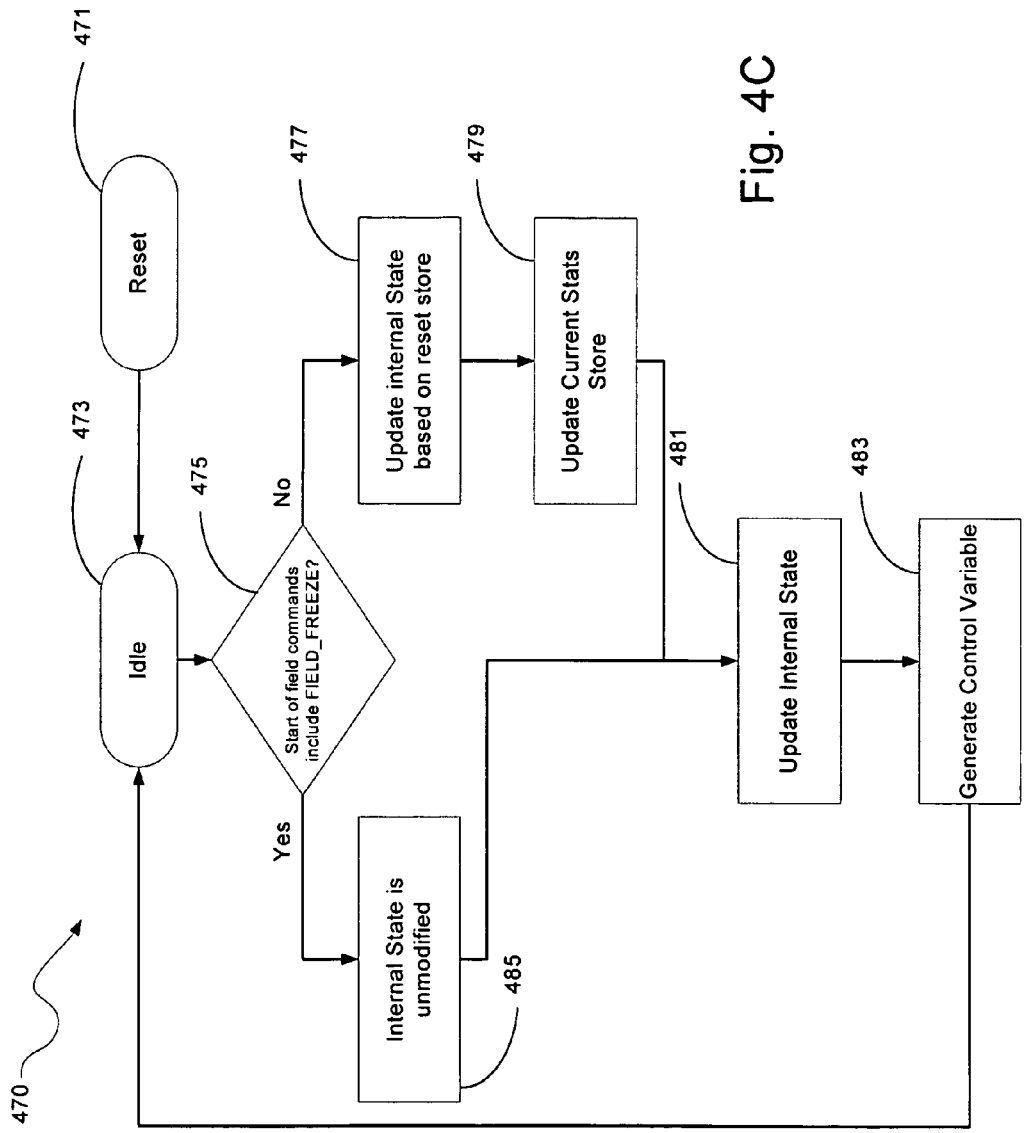
FIG. 4C illustrates another flowchart of an exemplary process, in accordance with an embodiment of the present invention.

FIG. 4C illustrates another flowchart of an exemplary process 470, in accordance with an embodiment of the present invention. The system may be in an idle state at 473. A reset signal may be sent at 471 from a field state FIFO such as, for example, the field state FIFO block 201 of FIG. 2. At a next step 475, it may be determined whether FIELD_FREEZE may be part of the start of field commands. If FIELD_FREEZE is part of the start of field commands, the internal state may remain unmodified at a next step 485 and may proceed to a next step 481.

If FIELD_FREEZE is not part of the start of field commands, the internal state 407 may be updated, at a next step 477, based on signals sent by the reset store block 409, which may be specified with a field start signal. Internal state 407 may be cleared based on reset store, as described hereinabove. The internal state 407 may be updated later based on signals from the next state generation block 405. When the internal state 407 is updated, the current stats store may also be updated at a next step 479 upon assertion of the field start signal and may proceed to a next step 481.

At a next step 481 the internal state 407 may be additionally updated based on the stats_store signal received by the next state generation block 405. The output signal produced by the control generation block 411 may be updated based on the outputs of the next state generation block 405 and the internal state 407. The control signal may then be generated at a next step 483 by the control generation block 411. The system may then return to the idle state 473 and wait for a new start of field command.

Referring to FIG. 4A, the stats store block 401 may comprise logic, circuitry and/or code that may be adapted to receive a plurality of input signals such as, for example, statistical data, and generate a plurality of output signals such as, for example, stats store signals to the field phase calculation block 403. The field phase calculation block 403 may be adapted to receive the output signals generated by the stats store block 401 and generate a plurality of signals, some of which may be sent to current field control state registers.

In an embodiment of the present invention, statistical data signals may be received by the stats store block 401 from within the deinterlacer. When the input field start signals are asserted, the corresponding states may be loaded, unless the trick mode is equal to the FIELD_FREEZE.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method in a deinterlacer, the method comprising:
   detecting a request to repeat a first video image input into the deinterlacer;
   processing the first video image to produce a corresponding output video image;
   holding input video images following the first video image in the deinterlacer, wherein the input video images following the first video image are after the first video image in decoding order;

displaying the output video image according to the request to repeat;

during the request to repeat the first video image, maintaining at least a portion of a state of a field store buffer and at least a portion of a state of a field phase calculator, the field phase calculator being configured to generate a control signal for a field control state register; and processing and displaying the input video images following the first video image.

2. The method according to claim 1, wherein the request to repeat comprises a number of repetitions corresponding to a desired video playback mode.

3. The method according to claim 2, wherein the desired playback mode comprises pausing.

4. The method according to claim 3, further comprising:
displaying the output video image by repeating the output video image;
detecting a request to terminate repeating the output video image; and
processing and displaying the video images following the first video image.

5. The method according to claim 2, wherein the desired playback mode comprises slow motion playing.

6. The method according to claim 5, wherein the number of repetitions corresponds to a desired slow motion rate.

7. The method according to claim 6, further comprising:
displaying the output video image by repeating each input video image for the number of repetitions;
detecting a request to terminate repeating each input video image; and
processing and displaying video images following a last video image repeated.

8. The method according to claim 2, wherein the desired playback mode comprises converting a display rate from an original display rate to a desired display rate.

9. A system in a deinterlacer, the system comprising:
at least one processing circuit operable to:
detect a request to repeat a first video image input into the deinterlacer;
process the first video image to produce a corresponding output video image;
hold input video images following the first video image in the deinterlacer, wherein the input video images following the first video image are after the first video image in decoding order;
display the output video image according to the request to repeat;
during the request to repeat the first video image, maintain at least a portion of a state of a field store buffer and at least a portion of a state of a field phase calculator, the field phase calculator being configured to generate a control signal for a field control state register; and
process and display the input video images following the first video image.

10. The system according to claim 9, wherein the request to repeat comprises a number of repetitions corresponding to a desired video playback mode.

11. The system according to claim 10, wherein the desired playback mode comprises pausing.

12. The system according to claim 11, wherein the at least one processing circuit is further operable to:
display the output video image by repeating the output video image;
detect a request to terminate repeating the output video image; and
process and display the video images following the first video image.

13. The system according to claim 10, wherein the desired playback mode comprises slow motion playing.

14. The system according to claim 13, wherein the number of repetitions corresponds to a desired slow motion rate.

15. The system according to claim 14, wherein the at least one processing circuit is further operable to:
display the output video image by repeating the output video image the number of repetitions;
detect a request to terminate repeating the output video image; and
process and display video images following a last video image repeated.

16. The system according to claim 10, wherein the desired playback mode comprises converting a display rate from an original display rate to a desired display rate.

17. The system according to claim 9, wherein the field store buffer comprises a respective field store buffer for a state of each field of the input video images.

18. The system according to claim 9, wherein the field store buffer comprises a bottom field buffer to store a state of each bottom field of the input video images and a top field buffer to store a state of each top field of the input video images.

19. A method in a deinterlacer, the method comprising:
detecting a request to repeat a first video image input into the deinterlacer;
processing the first video image to produce a corresponding output video image;
holding input video images following the first video image in the deinterlacer;
displaying the output video image according to the request to repeat; and
during the request to repeat the first video image, maintaining at least a portion of a state of a field store buffer and at least a portion of a state of a field phase calculator, the field phase calculator being configured to generate a control signal for a field control state register.

20. The method according to claim 19, further comprising:
determining a next state for the field phase calculator;
detecting a request to terminate repeating the output video image; and
updating the at least a portion of the state of the field phase calculator based on the next state, in response to the request to terminate repeating.

* * * * *